No. 719,615. PATENTED FEB. 3, 1903.
W. SCHULZE.
SUPPORT FOR RUBBER TIRED WHEELS.
APPLICATION FILED MAY 15, 1902.
NO MODEL.

Witnesses
M. C. Lyddane
Geo. Heinicke

Inventor.
Wilhelm Schulze.
by G. Dittmar Atty

UNITED STATES PATENT OFFICE.

WILHELM SCHULZE, OF GERA, GERMANY.

SUPPORT FOR RUBBER-TIRED WHEELS.

SPECIFICATION forming part of Letters Patent No. 719,615, dated February 3, 1903.

Application filed May 15, 1902. Serial No. 107,383. (No model.)

*To all whom it may concern:*

Be it known that I, WILHELM SCHULZE, residing in Gera, Germany, have invented certain new and useful Improvements in Supports for Rubber-Tired Wheels of Carriages, of which the following is a specification.

The present invention relates to a device for supporting vehicles provided with rubber-tired wheels, the object being to provide such a device which will prevent a flattening out of the tire by the pressure while the carriage is stored for a long period of time, the wheels being supported on blocks of angular cross-section, extending along the tire for a considerable distance outside the tires and under the rims, so that the tire is relieved of pressure and flattening prevented.

With this object in view the invention consists in the improved construction, arrangement, and combination of parts hereinafter fully described and afterward specifically claimed.

Figure 1:
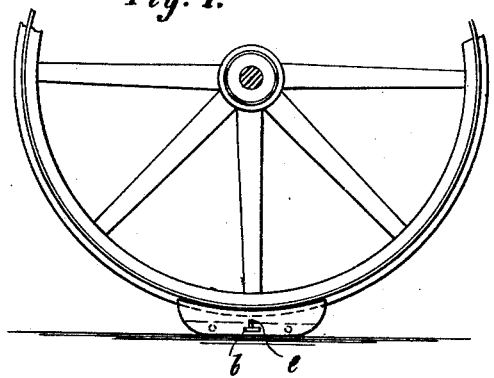
Figure 3:
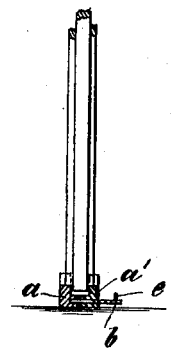
Figure 2:
Figure 4:
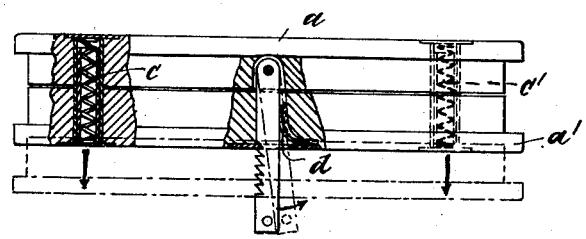

In the accompanying drawings, Figure 1 illustrates part of a carriage-wheel supported by the new device. Fig. 2 is a plan view showing the rim and the spokes of the wheel in section. Fig. 3 is a vertical section. Fig. 4 shows the device, partly in plan and partly in section, on an enlarged scale.

$a$ $a'$ are wooden blocks of angular cross-section and of a curvature approximately that of the periphery of the rubber tire.

The two blocks are rabbeted or cut away at their inner upper edges and are connected by a metal blade $b$, pivoted to the block $a$, as clearly shown in Fig. 4, and extending through an opening in the block $a'$, said blade having teeth on one edge, which engage a slotted plate $d$, secured on the lateral face of block $a'$. A flat spring may be used to press the notches or teeth into engagement with the plate $d$ at the end of the slot through which the plate $b$ is passed.

$c$ and $c'$ are springs loosely mounted at their ends in suitable sockets of metal or other convenient material inserted in the wood of the blocks $a$ and $a'$ in perfect alinement, so that the springs have a tendency to press the blocks $a$ $a'$ apart when the blade $b$ is shifted out of engagement with plate $d$. A pin $e$ at the end of the blade $b$ prevents the blocks $a$ $a'$ from being entirely separated. When the springs are allowed to expand to their fullest extent, the block $a'$ strikes against said pin $e$, the ends of the springs being still in place in their sockets. If a wheel is to be placed between the blocks, the springs are compressed by hand till they approach close to the sides of the rubber tire, a closer approach being prevented by the thickness of the rubber tire. In pushing the blocks together in the described manner the springs $c$ $c'$ will be compressed, and the blade $b$ under the influence of the flat spring will bring its teeth successively into engagement with the metal plate on the side surface of block $a'$, and thus lock the blocks in their final position, in which the rim of the wheel resting on top of the blocks will support the wheel and relieve the rubber tire from all pressure.

Having thus fully described my invention, what I claim as new, and desire to secure by Letters Patent of the United States, is—

A support for rubber-tired wheels comprising two curved blocks one of which is provided with a transverse slot and a plate on its outer face projecting slightly into said slot, a toothed plate pivoted to the other block passing through the slot and normally spring-pressed into engagement with said plate, a pin at the outer end of the blade to prevent the entire separation of the blocks, and springs mounted in sockets in the inner faces of the blocks, normally pressing the blocks apart substantially as described.

In testimony whereof I affix my signature.

WILHELM SCHULZE.

In presence of—
J. STEPHORN,
A. BRÄUTIGAM.